(12) United States Patent
Kaarto et al.

(10) Patent No.: US 9,683,096 B2
(45) Date of Patent: *Jun. 20, 2017

(54) POLYPROPYLENE RESIN SUITABLE FOR SOFT NONWOVEN APPLICATIONS

(75) Inventors: John Kaarto, Missouri City, TX (US); Alechia Crown, Pearland, TX (US); Li-Min Tau, Lake Jackson, TX (US); Gert J. Claasen, Richterswil (CH)

(73) Assignee: Braskem America, Inc., Philadelphia, PA (US)

( * ) Notice: Subject to any disclaimer, the term of this patent is extended or adjusted under 35 U.S.C. 154(b) by 650 days.

This patent is subject to a terminal disclaimer.

(21) Appl. No.: 12/859,499

(22) Filed: Aug. 19, 2010

(65) Prior Publication Data
US 2012/0046400 A1 Feb. 23, 2012

(51) Int. Cl.
*C08K 5/20* (2006.01)
*C08L 23/10* (2006.01)
*C08L 23/14* (2006.01)

(52) U.S. Cl.
CPC ............... *C08L 23/10* (2013.01); *C08K 5/20* (2013.01); *C08L 23/14* (2013.01); *C08L 2205/02* (2013.01); *C08L 2207/02* (2013.01)

(58) Field of Classification Search
USPC ........ 442/327, 361, 400, 401, 415; 525/191, 525/240
See application file for complete search history.

(56) References Cited

U.S. PATENT DOCUMENTS

| | | |
|---|---|---|
| 5,258,464 A | 11/1993 | McCullough, Jr. et al. |
| 5,362,782 A | 11/1994 | McCullough, Jr. et al. |
| 5,455,305 A | 10/1995 | Galambos |
| 5,529,845 A | 6/1996 | Branchesi et al. |
| 5,585,172 A | 12/1996 | Barsotti |
| 5,652,051 A | 7/1997 | Shawver et al. |
| 6,197,886 B1 * | 3/2001 | Chatterjee et al. ........... 525/240 |
| 6,346,756 B1 | 2/2002 | Ishikawa et al. |
| 6,383,654 B1 | 5/2002 | Yabe et al. |
| 6,433,087 B1 * | 8/2002 | Ebner et al. .................. 525/191 |
| 6,482,896 B2 | 11/2002 | Maugans et al. |
| 6,500,538 B1 | 12/2002 | Strack et al. |
| 2006/0008643 A1 | 1/2006 | Lin et al. |
| 2006/0173132 A1 * | 8/2006 | Mehta et al. ................. 525/191 |
| 2007/0173162 A1 * | 7/2007 | Ethiopia et al. ............. 442/327 |
| 2008/0070994 A1 | 3/2008 | Li et al. |

FOREIGN PATENT DOCUMENTS

| | | |
|---|---|---|
| EP | 0 457 455 A2 | 11/1991 |
| WO | WO 99/35430 | 7/1999 |
| WO | WO 2010/012833 A1 | 2/2010 |
| WO | WO 2010-087921 A1 | 8/2010 |
| WO | WO 01/36502 A1 | 5/2011 |

OTHER PUBLICATIONS

International Search Report, PCT/US2011/048405, Sep. 27, 2011.

* cited by examiner

*Primary Examiner* — Irina S Zemel
*Assistant Examiner* — Jeffrey Lenihan
(74) *Attorney, Agent, or Firm* — Duane Morris LLP

(57) ABSTRACT

A polypropylene impact copolymer is disclosed. The propylene impact copolymer composition comprises from 60 to 90 percent by weight of the impact copolymer composition of a matrix phase, which can be a homopolymer polypropylene or random polypropylene copolymer having from 0.1 to 7 mol percent of units derived from ethylene or $C_4$-$C_{10}$ alpha olefins. The propylene impact copolymer composition also comprises from 10 to 40 percent by weight of the impact copolymer composition of a dispersed phase, which comprises a propylene/alpha-olefin copolymer having from 6 to 40 mol percent of units derived from ethylene or $C_4$-$C_{10}$ alpha olefins, wherein the dispersed phase has a comonomer content which is greater than the comonomer content in the matrix phase. The propylene impact copolymer composition is further characterized by having the ratio of the dispersed phase intrinsic viscosity (IV) to the matrix phase IV being 0.95 or less. The polypropylene impact copolymers of the present invention are well suited for making spunbond fibers which can be used to make nonwoven fabrics having good haptics.

13 Claims, 4 Drawing Sheets

— 1 —

POLYPROPYLENE RESIN SUITABLE FOR SOFT NONWOVEN APPLICATIONS

FIELD OF THE INVENTION

The present invention relates to a new polypropylene impact copolymer composition ideally suited for use in producing spunbond nonwovens having improved softness and good tensile strength. The composition includes a majority of a matrix phase comprising a homopolymer polypropylene or random polypropylene copolymer comprising from 0.1 to 7 mol percent of units derived from ethylene or $C_4$-$C_{10}$ alpha olefins, and a minority of a dispersed phase comprising a propylene/alpha-olefin copolymer with alpha-olefin content ranging from 6-40 mol percent. The impact copolymer is characterized by having the ratio of the dispersed phase intrinsic viscosity (IV) (prior to any cracking) to the matrix phase IV being 1.2 or less.

BACKGROUND AND SUMMARY OF THE INVENTION

The global non-wovens market for polypropylene (PP) spunbond nonwoven (SBNW) materials is extremely large, with over 1700 kT of total global volume, split between market segments such as hygiene, homefurnishings, medical, industrial, etc. One of the most prominent property improvements desired for both absorbent hygiene materials and medical nonwovens produced from PP, is softness or haptics, in addition to noise and drape improvements. Polypropylene is the polymer of choice in the spunbond process due to its high tensile and abrasion resistance properties, the ease of processing, and the historically low price and high availability of the polymer. However, the haptics of the PP fabric are not ideal in terms of perceived softness.

Currently, there are a number of potential solutions for delivering softness or cloth-like feel for spunbond nonwovens. These include using bicomponent spunbond processes, using a blend of propylene/ethylene plastomers with PP, spinning random copolymers (that is random copolymers of polypropylene with 2-4% by weight of units derived from ethylene), and/or the addition of slip additives which can change the coefficient of friction (COF) of the PP surface. Additionally, there are fabrication modifications that can be implemented in order to change the surface of the fabric—thus making it feel softer. While these methods have proven successful to an extent, they have added cost or inefficiencies to the process. Accordingly new polypropylene materials which are capable of being spun into fiber in the spunbond process and produce soft fabrics are still desired.

A particular class of impact copolymers, which are historically considered to not be spinnable, has been discovered allowing at least some of these desired properties to be met. Accordingly, in one aspect of the present invention, an in-reactor polypropylene impact copolymer is provided which can be spun into fiber using the conventional spunbond process, and which will result in polypropylene fiber and formed fabric having improved softness. In one embodiment the invention is a polypropylene impact copolymer composition comprising from 60 to 90 percent by weight of the impact copolymer composition of a matrix phase comprising a homopolymer polypropylene or random polypropylene copolymer comprising from 0.1 to 7 mol percent of units derived from ethylene or $C_4$-$C_{10}$ alpha olefins; and from 10-40 percent by weight of the impact copolymer composition of a dispersed, preferably partially miscible phase comprising a propylene/alpha-olefin copolymer with alpha-olefin content ranging from 6-40 mol percent wherein the dispersed phase has a comonomer content which is greater than the comonomer content in the matrix phase. The difference should be sufficient, so that at least two distinct phases are present, although partial miscibility is desired. Although the specific amount that the comonomer must be different in order to ensure distinct phases will differ depending on the molecular weight of the polymers, in general it is preferred that the comonomer content in the dispersed phase is at least 10 mol percent greater (absolute), more preferably at least 12 mol percent greater. The impact copolymer of this embodiment is further characterized by having the ratio of the dispersed phase intrinsic viscosity (IV) to the matrix phase IV (also referred to as a beta/alpha value) being 0.95 or less.

A second aspect of the present invention is a fiber made from the impact copolymer of the first aspect of the invention. Such fibers can be melt spun on traditional spinning equipment to deniers of from 0.2 to 10, alternatively 0.5 to 2.0 and will have a broad bonding window.

Another aspect of the present invention is a spunbond nonwoven fabric produced from fibers of the second aspect of the invention. The spunbond nonwoven fabrics of this embodiment of the invention are characterized by having a lower bonding temperature as determined by the temperature of the calender oil being at least 5° C., preferably at least 10° C. lower than possible with a comparable nonwoven fabric made with hPP fibers; improved softness as determined by handle-o-meter and improved sensory testing panel results compared to nonwovens made with hPP fibers with regards to attributes such as smoothness, cloth-likeness, stiffness, and noise.

DETAILED DESCRIPTION OF THE INVENTION

Figure 1:
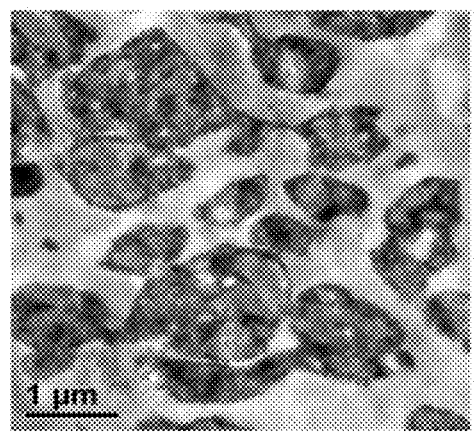
FIG. 1 is a Transmission Electron Microscopy image of an immiscible propylene impact copolymer system.

The following definitions and analytical methods are used in the present invention:

The term "polymer", as used herein, refers to a polymeric compound prepared by polymerizing monomers, whether of the same or a different type. The generic term polymer thus embraces the term "homopolymer", usually employed to refer to polymers prepared from only one type of monomer, as well as "copolymer" which refers to polymers prepared from two or more different monomers.

"Polypropylene" shall mean polymers comprising greater than 50% by weight of units which have been derived from propylene monomer. This includes polypropylene homopolymers or copolymers (meaning units derived from two or more comonomers).

Density is determined in accordance with ASTM D792.

"Melt flow rate" also referred to as "MFR" is determined according to ASTM D1238 (230° C., 2.16 kg).

The term molecular weight distribution or "MWD" is defined as the ratio of weight average molecular weight to number average molecular weight ($M_w/M_n$). $M_w$ and $M_n$ are determined according to methods known in the art using conventional gel permeation chromatography (GPC).

"$E_m$" refers to the mol percent of comonomer (typically ethylene) in the matrix phase.

"$E_{tot}$" refers to total percent by weight comonomer (typically ethylene) in the propylene impact copolymer, and is measured by a well known method reported by S. Di Martino and M. Kelchtermans "Determination of the Composition of Ethylene-Propylene Rubbers Using 13C-NMR Spectroscopy" J. of Applied Polymer Science, v 56, 1781-1787 (1995).

"$F_c$" refers to the percent by weight of the dispersed rubber phase in the total impact copolymer. In general $F_c$ is equal to the ratio of amount of material made in the second reactor to the total amount of material made which can readily be determined by mass balance. For typical impact copolymers, the rubber content in the impact copolymer generally can be assessed by determining the amount of material which remains soluble in xylene at room temperature. For matrix phases with low ethylene content (for example less than about 2 mol %), the xylene solubles method may be applicable to approximate $F_c$. Xylene Solubles (XS) is measured according to the following procedure: 0.4 g of polymer is dissolved in 20 ml of xylenes with stiffing at 130° C. for 30 minutes. The solution is then cooled to 25° C. and after 30 minutes the insoluble polymer fraction is filtered off. The resulting filtrate is analyzed by Flow Injection Polymer Analysis using a Viscotek Visco-GEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration was maintained with Viscotek PolyCAL™ polystyrene standards. The amount of xylene solubles measured by this Viscotek method corresponds to the amount of dispersed rubber phase (Fc) in the impact copolymer. Unless otherwise indicated, for purposes of the present invention, the mass balance method should be used to determine Fc.

"$E_c$" refers to the ethylene content percent by weight in the dispersed phase and is calculated as $E_c=[E_{tot}-E_m(1-F_c)]/F_c$.

"Bonding window" is determined by the range of surface temperatures or heated oil temperatures of the calendar roll and smooth roll which can be used in the bonding process of making a spunbonded nonwoven fabric to obtain the desired balance of physical properties (such as tensile strength, abrasion resistance and elongation) of the fabric.

The "Handle-O-Meter" is a commercially available apparatus from the Thwing-Albert Company. The Handle-O-Meter measures "handle" which is the combined effects of flexibility and surface friction of sheeted materials such as nonwovens. In this test, the smaller numbers reflect the more desired fabrics.

The following procedures are used to generate tensile testing data for nonwoven fabrics of the present invention. Basis weight may be determined by measuring the weight of a known area of fabric. For example, basis weight in $g/m^2$ may be determined according to ASTM D 3776.

Tensile testing according to the following norms is used, namely EDANA test methods:

a) ERT 60.2-99 Standard Conditioning; b) ERT 130.2-89 Nonwovens Sampling; c) ERT 20.2-89 and Iso test methods a) ISO 554-76 (E) b) ISO 186: 1985.

Breaking force and elongation of the nonwoven materials are determined using the following procedures. The test method describes two procedures Option A—IST 110.4-02 and Option B—ERT 20.2-89 for carrying out nonwoven material tensile tests. These procedures use two types of specimens which are Option A—25 mm (1.0 in.) strip tensile and Option B—50 mm (2.0 in.) strip tensile. A test specimen is clamped in a tensile testing machine with a distance between the jaws of the grips of 200 mm and a force is applied to extend the test specimen at a rate of 100 mm/min until it breaks. Values for the breaking force and elongation of the test specimen are obtained from a computer interface.

Breaking force (or Stress at Break) is the maximum force applied to a material prior to rupture. Materials that are brittle usually rupture at the maximum force. Materials that are ductile usually experience a maximum force before rupturing. Maximum Tensile strength is the strength of a material when subjected to the pulling test. It is the stress a material can bear without breaking or tearing. A high precision electronic test instrument used that measures the elongation and tensile strength of materials while pulling forces are applied to the material. The force which is exerted on the specimen is read directly from the testing machine or graphs obtained during the test procedure. For each sample at least 5 specimens were tested and the average was calculated and used for the breaking force observed for the sample. This average is called the maximum breaking force or maximum tensile force.

Elongation (or Strain at Break) is the deformation in the direction of load caused by a tensile force. Elongation is expressed as a ratio of the length of the stretched material as a percentage to the length of the unstretched material. Elongation at break is determined at the point where the stretched material breaks. The apparent elongation is determined by the increase in length from the start of the force-extension curve to a point corresponding with the breaking force, or other specified force. The apparent elongation is calculated as the percentage increase in length based on the gage length ($L_0$).

$$\text{Elongation (\%)} = \frac{L_{break} - L_o}{L_o} \times 100\%$$

"Abrasion resistance" is determined as follows. A nonwoven fabric or laminate is abraded using a Sutherland 2000 Rub Tester to determine the fuzz level. A lower fuzz level is desired which means the fabric has a higher abrasion resistance. An 11.0 cm×4.0 cm piece of nonwoven fabric is abraded with sandpaper according to ISO POR 01 106 (a cloth sandpaper aluminum oxide 320-grit is affixed to a 2 lb. weight, and rubbed for 20 cycles at a rate of 42 cycles per minute) so that loose fibers are accumulated on the top of the fabric. The loose fibers were collected using tape and measured gravimetrically. The fuzz level is then determined as the total weight of loose fiber in grams divided by the fabric specimen surface area (44.0 cm²).

"Beta/alpha" (b/a or β/α) is normally measured as the intrinsic viscosity (IV) of the dispersed phase divided by the IV of the homopolymer or random copolymer matrix. However on a practical level, as used in the production of impact copolymer polypropylene products, b/a can be expressed as the ratio of the melt flow of the homopolymer/random copolymer reactor product (Reactor No. 1) to that of the overall impact copolymer reactor product (Reactor No. 2), according to the following equation, with both melt flows measured on stabilized powder samples. When the beta/alpha is kept within the specified range for in-reactor produced impact copolymers, the product gel content can be minimized, and the rubber domain size can be minimized.

$$\beta/\alpha = \frac{(MFR_1/MFR_2)^{0.213} - 1}{(Fc/100)} + 1$$

Where $MFR_1$ is the first reactor (matrix phase only) and $MFR_2$ is the second reactor (overall ICP), and $F_c$ is the percent by weight of the dispersed phase in the impact copolymer composition.

Figure 2:
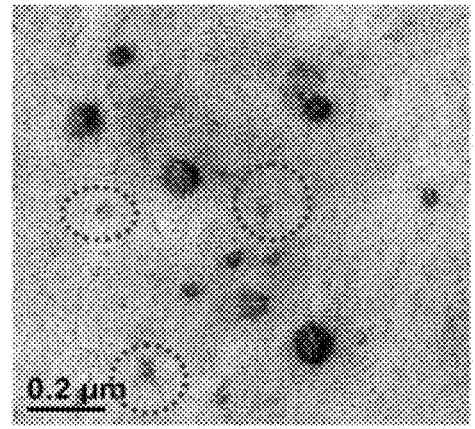
FIG. 2 is a Transmission Electron Microscopy image of a partially miscible propylene impact copolymer system.

"Miscibility" of the dispersed phase within the matrix phase is determined using transmission electron microscopy ("TEM") according to the method described below. As seen in a comparison between FIG. 1 (showing a completely immiscible system) and FIG. 2 (showing a partially miscible system), evidence of immiscibility is observed by the darkened and enhanced appearance of the crystalline lamellae structure in the rubber modified formulations. The relatively lighter areas of darkening, or appearance of "dirty lamellae" is an indication that partial miscibility and incorporation of the elastomer has occurred (see areas within the circles for examples). Since lower density components such as the elastomer, stain more aggressively than higher density components, these darker, patch-like diffuse regions are believed to be associated with partial miscibility of the elastomer within the crystalline homopolymer polypropylene matrix. Accordingly materials in which the TEM image contains such dirty lamellae are said to be "partially miscible".

The TEM method is as follows: Samples are prepared from pellets and fabrics. The extruded pellet samples are trimmed so that sections could be collected at the core and perpendicular to the extrudate flow. The fabric samples are embedded in epoxy resin to secure the fibers and provide stability during sectioning. The trimmed samples are cryopolished prior to staining by removing sections from the blocks at −60° C. to prevent smearing of the elastomer phases. The cryo-polished blocks are stained with the vapor phase of a 2% aqueous ruthenium tetraoxide solution for 3 hrs at ambient temperature. The staining solution is prepared by weighing 0.2 gm of ruthenium (III) chloride hydrate (RuCl3×H2O) into a glass bottle with a screw lid and adding 10 ml of 5.25% aqueous sodium hypochlorite to the jar. The samples are placed in a glass jar using a glass slide having double sided tape. The slide is placed in the bottle in order to suspend the blocks about 1 inch above the staining solution. Sections of approximately 90 nanometers in thickness are collected at ambient temperature using a diamond knife on a Leica EM UC6 microtome and placed on 600 mesh virgin TEM grids for observation. Images are collected on a JEOL JEM-1230 operated at 100 kV accelerating voltage and collected on a Gatan-791 and 794 digital cameras. The images are post processed using Adobe Photoshop 7.0. Size distribution analysis: Image analysis is performed using Leica Qwin Pro V2.4 software from TEM images. The magnification selected for image analysis depends on the number and size of features to be analyzed. In order to allow for binary image generation of elastomer distributions, manual tracing of the elastomer domains from the TEM prints is carried out using a black Sharpie marker. The traced TEM images are scanned using a Hewlett Packard Scan Jet 4c and are imported into Adobe Photoshop 7.0. The images are enhanced by adjusting brightness and contrast to more clearly show the features of interest. The digital images are imported into a Leica Qwin Pro V2.4 image analysis program and converted to binary images by setting a gray-level threshold to include the features of interest. Once the binary images are generated, other processing tools are used to edit images prior to image analysis. Some of these features include removing edge features, accepting or excluding features and manually cutting features that require separation. Once the features in the images are measured, the sizing data is exported into an Excel spreadsheet that is used to create bin ranges of the desired features. Using a histogram function, the sizing data is placed into appropriate bin ranges and a histogram of equivalent circular diameters versus percent frequency is generated. Parameters reported are circular diameter minimum, maximum, and average sizes along with standard deviations. Using the same binary images used for the size distribution analysis, an area percent analysis that the elastomer domains occupied within the PP matrix can be determined. The value can be reported as a percentage that the elastomer domains occupied in two dimensions.

The propylene impact copolymers (sometimes referred to as "ICPs") of this invention comprise at least two major components, the matrix and the dispersed phase. The matrix phase will comprise from 60 to 90 percent, preferably 65 to 85 percent by weight of the impact copolymer composition. The matrix phase can be homopolymer polypropylene or random polypropylene copolymer comprising from 0.1 to 7 mol percent, preferably from 0.5 to 3 mol percent of units derived from ethylene or $C_4$-$C_{10}$ alpha olefins. In general it is preferred that the matrix comprises a propylene alpha olefin copolymer and ethylene is the most preferred comonomer.

Particularly for high speed spinning processes such as spunbond applications, the matrix phase propylene homopolymer or random copolymer should have a reactor (i.e. before cracking) melt flow rate in the range of from 0.5 to about 10 g/10 min, preferably from 1.0 to about 7 g/10 min, and more preferably in a range from about 1.2 to about 4 g/10 min. These materials can be advantageously cracked such as by reacting with a peroxide to obtain higher melt flow rates. Such cracking typically takes place post reactor, and can advantageously be used increase the MFR at a crack ratio of from 7 to 35, preferably 8 to 30, more preferably from 10-25, such that the MFR for the resulting overall ICP is in the range of 7 to 350 g/10 min, preferably 10 to 150 g/10 min, still more preferably 15 to 100 g/10 min or even more preferably 25 to 65 g/10 min.

For meltblown applications the MFR for the overall ICP (whether cracked or from the reactor) can be as high as 2000 g/10 min. For staple fiber applications the MFR for the overall ICP can be in the range of from 8 to 35 g/10 min, or 12 to 18 g/10 min. For other applications such as blown or cast films, the MFR may be lower, including fractional MFR (that is, MFR less than one).

The propylene impact copolymer should have a narrow molecular weight distribution (Mw/Mn) for high speed spinning applications, such as less than 3.5 or preferably less than 3. This can be obtained, for example, by use of single site catalysts, or through the use of cracking.

The dispersed phase of the propylene impact copolymers of the present invention will comprise from 10 to 40 percent by weight, preferably from 15 to 35 percent by weight of the impact copolymer. The dispersed phase will comprise a propylene/alpha-olefin copolymer with alpha-olefin content ranging from 6 to 40 mol percent, more preferably 7 to 30 percent and even more preferably from 8 to 18 percent wherein the dispersed phase has a comonomer content which is greater than the comonomer content in the matrix phase. The difference in comonomer content between the matrix phase and the dispersed phase should be sufficient, so that at least two distinct phases are present, although partial miscibility is desired. While the specific amount that the comonomer must be different in order to ensure distinct phases will differ depending on the molecular weight of the polymers as well and the relative amounts of the various phases, in general it is preferred that the comonomer content in the dispersed phase is at least 10 mol % percent greater (absolute), more preferably at least 12 mol percent greater. The alpha-olefin used as the comonomer for the dispersed phase can be ethylene or $C_4$-$C_{10}$ alpha olefins. While not intending to be bound by theory, it is hypothesized that softness of the resulting fiber or nonwoven fabric will be improved when the dispersed phase is partially miscible in the matrix phase. As such, it is generally preferred that the comonomer used in the dispersed phase be the same as the comonomer (if any) used in the matrix phase, as it is believed this will aid in increasing miscibility. Accordingly, ethylene is a preferred comonomer for the dispersed phase as well.

It has been discovered that the softness of resulting fibers and/or nonwovens is improved when the impact copolymers of this invention are further characterized by having the ratio of the dispersed phase intrinsic viscosity (IV) (prior to any cracking) to the matrix phase IV (also referred to as a beta/alpha value) being 0.95 or less, or even 0.9 or less. Again, it is believed that having intrinsic viscosity ratios that are similar helps the dispersed phase be more miscible within the matrix phase, which is theorized to lead to the improved softness and high speed spinnability.

As previously stated it is believed that softness will be improved when the dispersed phase is partially miscible within the matrix phase. Miscibility can be determined according to the methods described above.

It is preferred that the impact copolymers of the present invention have a total comonomer (preferably ethylene) content of 0.6 to 20.2.

While these impact polypropylene products can be produced by melt compounding the individual polymer components, it is preferred that they are made in-reactor. This is conveniently accomplished by polymerizing the propylene to be used as the matrix polymer in a first reactor and transferring the polypropylene from the first reactor into a secondary reactor where propylene and ethylene (or other comonomer) are copolymerized in the presence of the material having higher crystallinity. Such "reactor-grade" products, theoretically can be interpolymerized in one reactor, but are more preferably formed using two reactors in series. The impact copolymers of this invention may conveniently be prepared by conventional (for impact copolymers) polymerization processes such as a two-step process although it is conceivable that they may be produced in a single reactor. Each step may be independently carried out in either the gas or liquid slurry phase. For example the first step may be conducted in a gas phase or in liquid slurry phase. The dispersed phase is preferably polymerized in a second, gas phase reactor.

In an alternative embodiment, the polymer material used for the matrix is made in at least two reactors in order to obtain fractions with varying melt flow rate. This has been found to improve the processability of the impact copolymers. This may be particularly applicable for production of staple fibers by short spin processes.

As is generally known in the art, hydrogen may be added to any of the reactors to control molecular weight, intrinsic viscosity and melt flow rate (MFR). The composition of the dispersed rubber phase is controlled (typically in the second reactor) by the ethylene/propylene ratio and the amount of hydrogen.

The final impact copolymers as obtained from the reactor or reactors, can be blended with various other components including other polymers. A variety of additives may be incortporated into the impact copolymer for various purposes as is generally known in the art. Such additives include, for example, stabilizers, antioxidants (for example hindered phenols such as Irgafos™ 1010 from the Ciba-Geigy Corporation), phosphites (for example Irgafos™ 168 from the Ciba-Geigy Corporation), cling additives (for example polyisobutylene), polymeric processing aids (such as Dynamar™5911 from Dyneon Corporation or Silquest™ PA-1 from General Electric Company), fillers, colorants, antiblock agents, acid scavengers, waxes, antimicrobials, uv stabilizers, nucleating agents and antistat agents. In particular, the addition of slip agents, such as erucamide, has been found to improve the perceived softness of fibers and/or nonwovens made from the impact copolymers.

The impact copolymers of the present invention are well suited for use in fiber lines commonly used in the art. Fibers can be advantageously made in thicknesses of from 0.5 to 15 denier, more preferably from about 1.5 to 3 denier. Meltblown fibers can be from 200 nanometer to 10 microns in diameter. The impact copolymers can be spun at high speeds, for example at filament velocities of 1000 to 5000 m/min.

Such fibers, whether produced in monocomponent or bicomponent form, can advantageously be used for making nonwoven fabrics. As used herein a "nonwoven" or "nonwoven fabric" or "nonwoven material" means an assembly of monocomponent and/or bicomponent fibers (for example, core/sheath, islands in the sea, side-by side, segmented pie etc.) held together in a random web such as by mechanical interlocking or by fusing at least a portion of the fibers. Nonwoven fabrics can be made by various methods generally known in the art. Fibers produced by melt spinning processes that include staple fiber spinning (including short spinning, long spinning), Spunbond, melt blown or multiple combinations thereof can be formed into a web which is thereafter is formed into a nonwoven fabric using binding technologies such as carded thermal bonding, wetlaid, airlaid, airthrough bonding, calendar thermal bonding, hydro entanglement, needlepunching, adhesive bonding or any combinations thereof. These various nonwoven fabric manufacturing techniques are well known to those skilled in the art and are very accurately described in literature such as "Synthetic Fibers—Machines and Equipment Manufacture and Properties" by Fourne—chapters IV and V.

In one aspect, the impact copolymers of the present invention are used to make monocomponent and/or bicomponent staple fibers according to methods commonly used in the art. These staple fibers can be used with a carding line to produce fabrics.

Alternatively, the impact copolymers of the present invention can be used in a spunbond nonwoven process. As is generally known in the art, in such a process, long continuous monocomponent and/or bicomponent fibers are produced and randomly deposited in the form of a web on a continuous belt. Bonding can then be accomplished by methods known in the art such as hot-roll calendering or by passing the web through a saturated-steam chamber at elevated pressure or using hydro entanglement or hot airthrough bonding or needlepunching etc. The fibers of the present invention are particularly well suited to make a spunbonded nonwoven material and multilayer composite materials where various optimized line configurations such as SMS, SMMS, SMMMS, SSMMS, SSMMMS, SXXXXXXS where X could be any format of web produced by melt spinning processes, can be utilized It has been found that fabrics made from monocomponent and/or bicomponent fibers comprising the impact copolymers of the present invention can be characterized by their good haptics.

While haptics are not easily quantified, they can be evaluated using sensory panels. Sensory panelists can be asked to rank various samples according to attributes such as "smoothness"; "cloth-like"; "stiffness" and "noise intensity".

A more objective test involves the use of a commercially available device known as "Handle-O-Meter". This device evaluates surface friction and stiffness of fabrics. Preferably, nonwoven fabrics of the present invention have a handle of 4 g or less, more preferably a handle of 3 g or less, when a single ply 6 inch by 6 inch sample is evaluated using a 100 gm beam assembly and a 10 mm slot width.

Fabrics can also be evaluated for tensile strength, abrasion resistance, and elongation. The nonwoven fabrics of the present invention preferably have a tensile strength in both MD and CD (for a 20 gsm fabric) in the range of from greater than 25, preferably 30 N/5 cm, more preferably from 40 N/5 cm. The nonwoven fabrics of the present invention preferably have an abrasion in the range of from less than 0.5 mg/cm$^2$, more preferably 0.4; 0.3. The nonwoven fabrics of the present invention preferably have an elongation in the range of greater than 40%, more preferably greater than 60%, even more preferably greater than about 75%.

The nonwoven fabrics of the present invention can be used to make many end-use articles. Such articles include hygiene absorbent products (such as baby diapers, adult incontinence, or feminine-hygiene products), medical nonwovens (such as gowns, drapes or masks), protective clothing (such as masks or body suits) and wipes.

In addition to fibers, and nonwoven fabrics or composite structures made from fibers, the compositions of the present invention can also be used to make other fabricated articles such as oriented cast film, non-oriented cast film, thermoformed articles, injection molded articles, oriented blown film, non-oriented blown film and blow molded articles.

EXAMPLES

A first series of propylene impact copolymers was made in a dual reactor set up where the matrix polymer was made in a first gas phase reactor and then the contents of the first reactor are passed to a second gas phase reactor. The ethylene content in the matrix (Em) and dispersed phase (Ec) and the amount of the dispersed phase (Fc), and the beta/alpha for each ICP is determined according to the test methods above and reported in Table 1. The resulting impact copolymers were cracked using peroxide to the overall melt flow rate reported in Table 1. Comparative Example 1 is a polyethylene fiber having a melt index (190° C./2.16 kg) 30 g/10 min and a density of 0.955 g/cc. Comparative Examples 2 and 3 each are a propylene impact copolymer having a beta/alpha value outside the scope of the present invention which demonstrates the degradation in the ability to spin fibers.

These materials were then evaluated on a Hills fiber spinning line. First the samples were evaluated to determine the Ramp to Break. In this test, the fiber strands are wrapped around the bottom spinning roller of the Hills fiber spinning line while it is at 500 m/min. No spin finish is used. The roller is then accelerated in 100 m/min increments from 500 m/min to 5000 m/min over a 2 min time span. The breaking point occurs when a massive breaking of the strands (normally 5 or more strands breaking at once) is observed. For examples in which the Ramp to Break is reported as ">5000", no breaking point was observed.

The materials were also evaluated to determine the Stick point. This test is conducted as follows: With the fibers wrapped around the same bottom spinning roller as is used in ramp to break test, a glass stir rod is pressed gently against the fibers at the bottom and slowly moved upwards until the fibers stick and the strands are broken. The stick point is recorded as the height of the glass rod at the point where massive breaking occurs (5 or more strands).

TABLE 1

| Example # | MFR$_{matrix\ phase}$ (g/10 min) | MFR$_{ICP}$ (g/10 min) | F$_c$ (wt %) | E$_m$ (wt %) | E$_c$ (wt %) | E$_{tot}$ (wt %) | Beta to Alpha ratio | MFR after cracking | Ramp to Break (m/min) | Stick point (cm) |
|---|---|---|---|---|---|---|---|---|---|---|
| 1 | 3.1 | 2.73 | 31.7 | 0 | 12.1 | 3.8 | 1.1 | 34.6 | >5000 | 52.5 |
| 2 | 3.0 | 3.21 | 32.0 | 1.09 | 9.4 | 3.8 | 0.9 | 38 | >5000 | 39 |
| 3 | 2.7 | 3.23 | 30.3 | 1.06 | 11.8 | 4.3 | 0.9 | 37.6 | >5000 | 35 |
| 4 | 3.0 | 3.65 | 30.4 | 0.92 | 14.0 | 4.9 | 0.9 | 35.2 | >5000 | 49 |
| 5 | 2.9 | 2.97 | 31.3 | 2.0 | 10.4 | 4.7 | 1.0 | 36.2 | 4600 | 42 |
| 6 | 3.0 | 3.34 | 35.1 | 1.03 | 11.2 | 4.6 | 0.9 | 37 | 4830 | 41 |
| 7 | 3.5 | 3.63 | 43.7 | 1.07 | 9.6 | 4.8 | 1.0 | 37 | >5000 | 40 |
| 8 | 3.2 | 3.6 | 30.4 | 0 | 9.2 | 2.8 | 0.9 | 36.6 | >5000 | 32 |
| Comp 1 | | | | | | | | | >5000 | 33 |
| Comp 2 | | | 20.5 | | 60 | 12.3 | 1.5 | 8 cracked to 34 | 3317 | 39 |
| Comp 3 | 25 | nm | 25.5 | | 55 | 14 | 2.2 | 7.5 cracked to 35 | not spinnable = 0 | |

A series of nonwoven fabrics were made using the resins described in Table 2 using Reicofil™ 4 spunbond technology from Reifenhäuser Gruppe. (Note that Examples 10 and 12 are the same as Examples 9 and 11 respectively, with the addition of 500 ppm erucamide). The machine used in this validation was a 1.2 meter wide line running at 180 kg/h/m throughput running at a line speed of 150 m/min and utilizing thermal calendar bonding between a embossed roll and a smooth roll with a nip pressure of 70 N/mm and at various temperatures indicated in Table 2 or in the description of the comparative examples below. All fabric is made at a basis weight of approximately 20 g/m$^2$ (20 GSM).

These materials were compared against nonwoven fabrics made from the following resins: For the purposes of the present invention, "bonding temperature" refers to the oil temperature used in the calender roll which may be several degrees higher than the surface temperature of the fabric, as is generally known in the art. Comparative Example 4 is homopolymer polypropylene having a melt flow rate of 35 which has been cracked from a homopolymer polypropylene having a melt flow rate in the range of 3-4 g/10 min (230°/2.16 kg) (bonding temperature of 150/148° C.). Comparative Example 5 is a random polypropylene copolymer ("RCP") having 3.2% ethylene and a melt flow rate of 35 g/10 min (bonding temperature 145/143° C.). Comparative Example 6 is a blend of 30% (by weight) of a propylene based plastomer having a melt flow rate of 25 g/10 min and a density of 0.876 g/cc, commercially available from the Dow Chemical Company as VERSIFY™ 4200 plastomer, and 70% of the homopolymer polypropylene described in Comparative Example 4 (bonding temperature 135/133° C.). Comparative Example 7 is a bicomponent (sheath/core) fiber produced while the machine was running at 240 kg/h throughput running at a line speed of 175 m/min and utilizing thermal calendar bonding between a embossed roll and a smooth roll with a calendar roll oil temperature of 140° C. The bicomponent fiber of comparative example 7 comprised 50% by weight of a core of the homopolymer polypropylene described in Comparative Example 4 and 50% by weight of a sheath of the polyethylene material described in Comparative example 1.

The attributes 'Stiffness' and 'Noise Intensity' are analyzed using a single sheet of nonwoven fabric laid directly on the counter top. The three digit blinding codes are written on the bottom edge of the sheets.

The samples are places in the panelist booths using a random order (Williams Design) of presentation.

The human panel used for this evaluation is a trained panel. It is comprised of in-house people (employees of The Dow Chemical Company) that have been trained how to evaluate polyolefin product for haptics characteristics. They have learned how to focus on one attribute at a time, rather than be overwhelmed by all the characteristics of the material at once. They have the capability to determine differences between samples with very small differences and have been trained on the various hand-feel techniques required for reliable, reproducible data.

Each attribute was analyzed using an F-statistic in Analysis of Variance (ANOVA) to determine if there were any significant differences among the samples in the multiple comparisons. The F-ratio in the ANOVA indicated samples to be significantly different, so a Fisher's Least Significant Difference (LSD) was calculated to determine One-at-a-Time multiple comparisons. The Fisher's LSD test is used for pairwise comparisons when a significant F-value has been obtained. When the significance level is >5%, this is considered to be no significant difference.

The data in the tables below are the mean values of the attributes. Lower numbers indicate more favorable/better values. The alpha characters next to the mean values indicate statistical differences at the 5% level. Letters that are different indicate that the samples are statistically different. Letters that are the same indicate that there is no statistical difference. Entries with multiple letters (for example "ab") mean that there is not statistical difference between the particular example and either grouping. For Example in the smoothness ranking in Table 1 below, Example 10 is not statistically different from either example 11 or example 12; however examples 11 and 12 are statistically different from each other.

TABLE 2

| Example # | MFR$_{matrix\ phase}$ (g/10 min) | MFR$_{ICP}$ (g/10 min) | Fc (wt %) | Em (wt %) | Ec (wt %) | Etot (wt %) | Beta to Alpha ratio | Calendar oil temperature used for bonding (° C.) |
|---|---|---|---|---|---|---|---|---|
| 9 | 3.1 | 3.4 | 32 | 1.1 | 12.9 | 4.9 | 0.9 | 145/143 |
| 10 | 3.1 | 3.4 | 32 | 1.1 | 12.9 | 4.9 | 0.9 | 135/133 |
| 11 | 3.1 | 3.5 | 30 | 1.1 | 17.6 | 6 | 0.9 | 135/133 |
| 12 | 3.1 | 3.5 | 30 | 1.1 | 17.6 | 6 | 0.9 | 135/133 |

Sensory panel testing was used to determine if hand-feel and auditory differences between the several samples could be detected. The panelists were asked to rank the nonwoven fabric samples by the attributes of "Smoothness", "Cloth-like", "Stiffness", and "Noise Intensity". The procedure used is as follows: The nonwoven A4 size sheets are cut in half. One of the 5¾"×8¼" sheets is used for the attributes 'Smoothness' and 'Cloth-like' and the other 5¾"×8¼" sheet is used for the attributes 'Stiffness' and 'Noise Intensity'.

The attributes 'Smoothness' and 'Cloth-like' are analyzed using nonwoven covered napkins. Four napkins are stacked on top of one another and the nonwoven fabric sheet is placed on top of the napkins. Labels with a three digit blinding code are adhered to the bottom edge of the sheets.

TABLE 3

| Example | Smoothness Ranking | Cloth-like Ranking | Stiffness Ranking | Noise Intensity Ranking |
|---|---|---|---|---|
| Comp 4 | 5.31 a | 4.38 a | 5.97 a | 5.83 a |
| 10 | 3.17 bc | 3.55 ab | 3.97 b | 3.79 b |
| 11 | 3.72 b | 3.72 ab | 3.62 b | 3.76 b |
| 12 | 2.24 c | 2.59 c | 2.03 c | 3.41 b |
| Comp 6 | 4.00 b | 3.79 ab | 3.72 b | 2.28 c |
| Comp 7 | 2.55 c | 2.97 bc | 1.69 c | 1.93 c |

Figure 3:
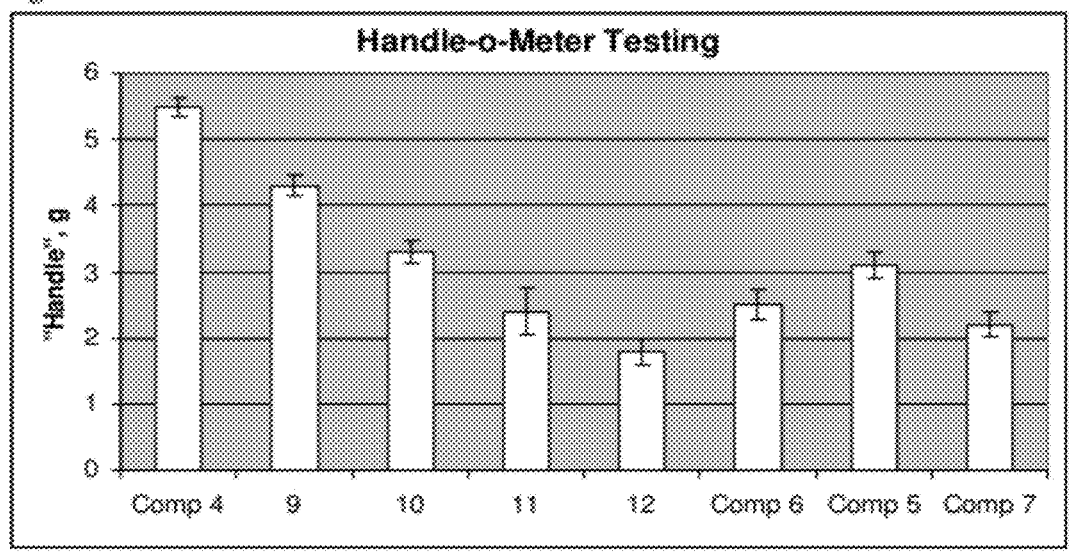
FIG. 3 is a bar graph depicting the handle-o-meter results from several of the examples and comparative examples of the present invention.

A single ply 6 inch by 6 inch sample of each of these fabrics are also evaluated for "handle" (i.e. a stiffness-friction determination) according to the handle-o-meter testing with a machine set up using a 100 gm beam assembly and a 10 mm slot width. The results of this testing is presented in FIG. 3.

Figure 4:
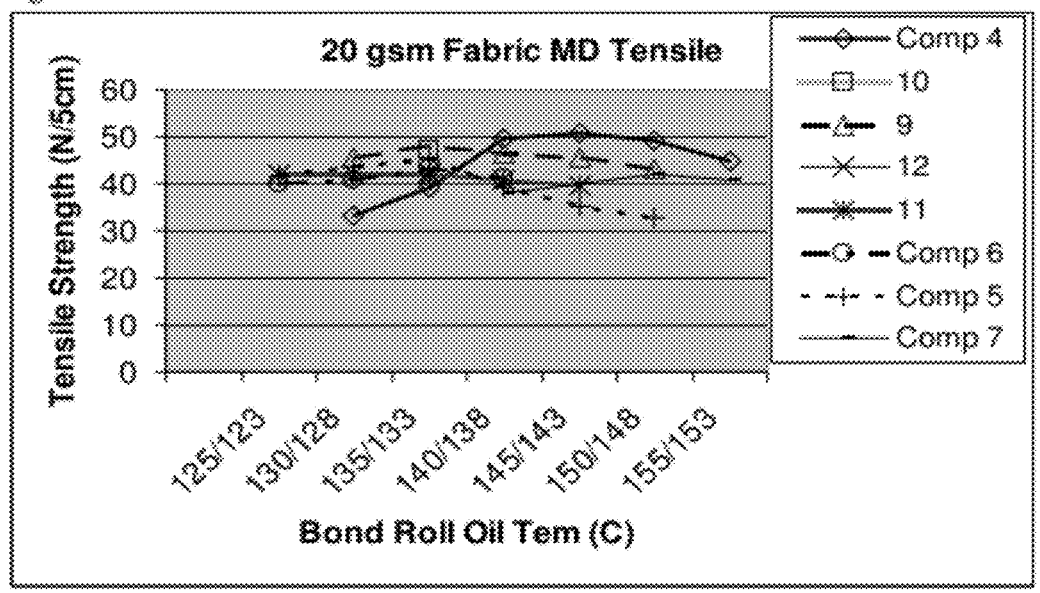
FIG. 4 is a graph showing the tensile strength in the machine direction vs. bonding temperature from several of the examples and comparative examples of the present invention.
Figure 5:
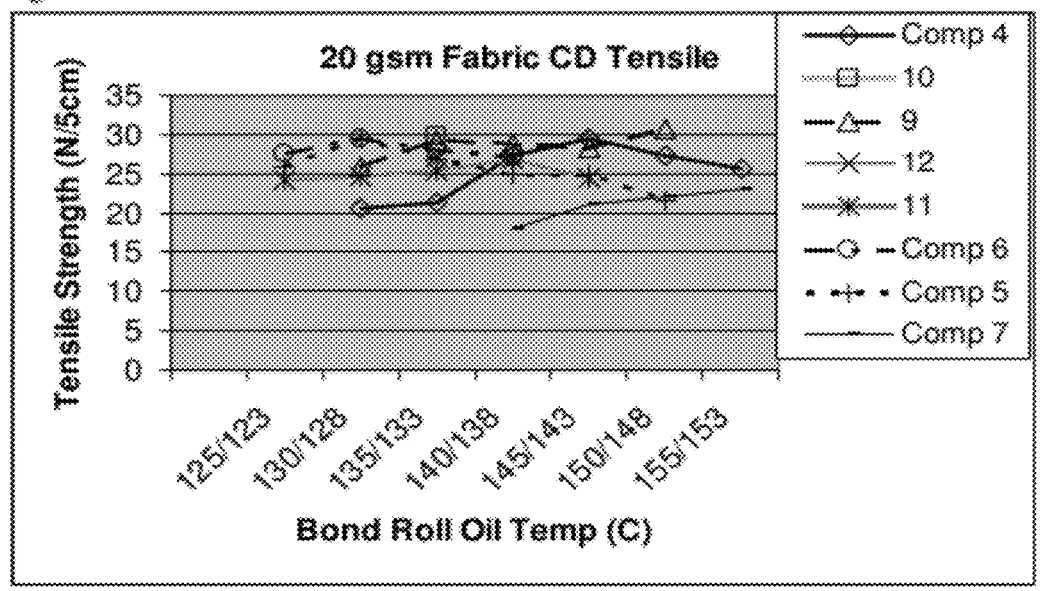
FIG. 5 is a graph showing the tensile strength in the cross direction vs. bonding temperature from several of the examples and comparative examples of the present invention.

These fabrics are also evaluated for tensile strength (in both the machine and cross direction). The results of this testing is presented in FIG. 4 and FIG. 5.

Figure 6:
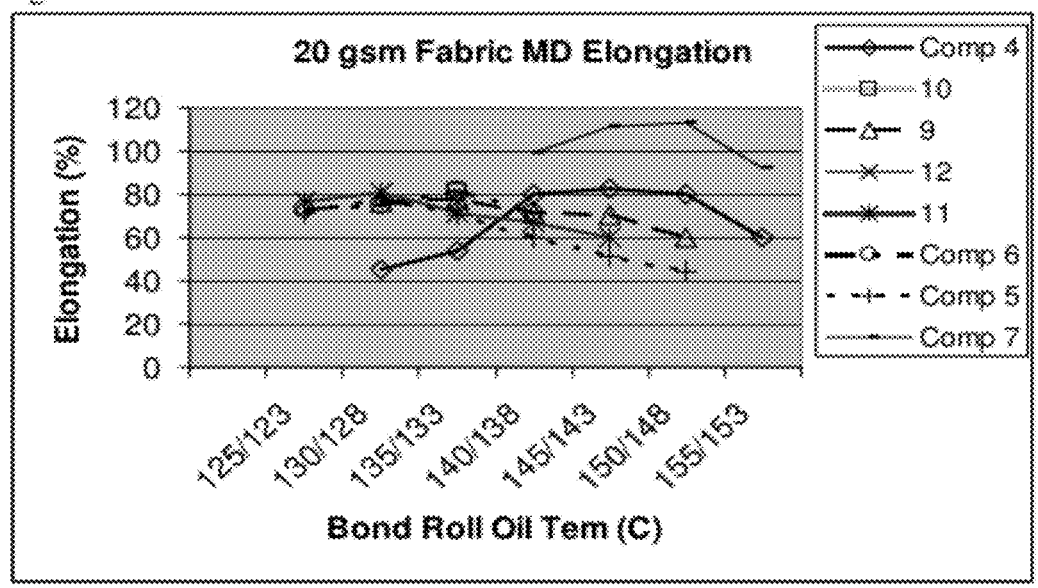
FIG. 6 is a graph showing the elongation in the machine direction vs. bonding temperature from several of the examples and comparative examples of the present invention.
Figure 7:
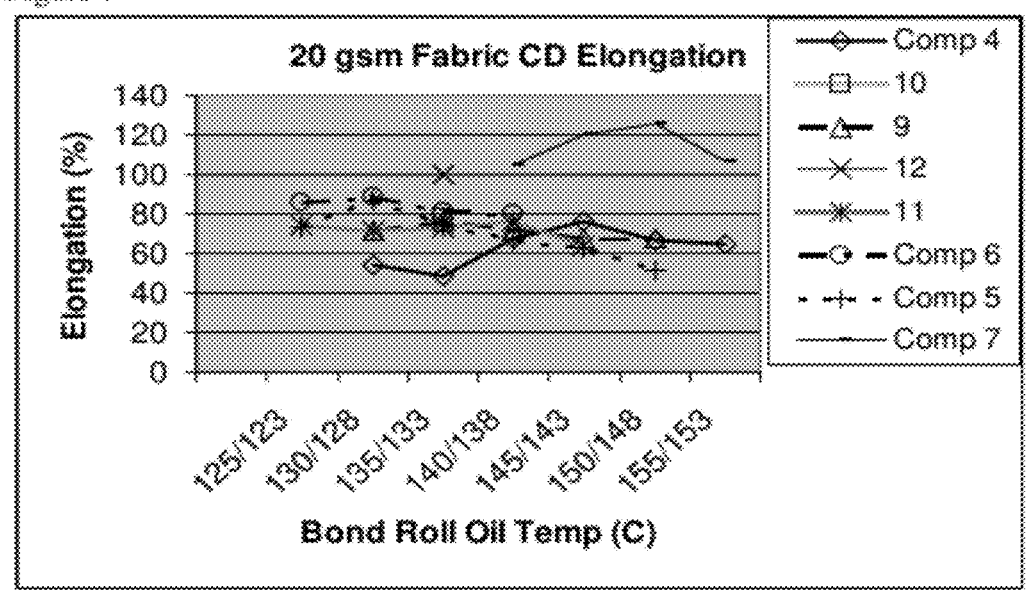
FIG. 7 is a graph showing the elongation in the cross direction vs. bonding temperature from several of the examples and comparative examples of the present invention.

These fabrics are also evaluated for elongation (in both the machine and cross direction). The results of this testing is presented in FIG. 6 and FIG. 7.

What is claimed is:

1. A polypropylene impact copolymer composition comprising:
   a) from 60 to 90 percent by weight of the impact copolymer composition of a matrix phase, said matrix phase comprising a homopolymer polypropylene or random polypropylene copolymer having from 0.1 to 7 mol percent of units derived from ethylene or $C_4$-$C_{10}$ alpha olefins; and
   b) from 10 to 40 percent by weight of the impact copolymer composition of a dispersed phase, said dispersed phase comprising a propylene/alpha-olefin copolymer having from 6 to 40 mol percent of units derived from ethylene or $C_4$-$C_{10}$ alpha olefins, wherein the dispersed phase has a comonomer content which is greater than the comonomer content in the matrix phase, wherein the impact copolymer is characterized by having a beta/alpha ($\beta/\alpha$) ratio of 0.9 or less,
   with $$\beta/\alpha = \frac{(MFR_1/MFR_2)^{0.213} - 1}{(Fc/100)} + 1$$

where $MFR_1$ is the first reactor (matrix phase only), $MFR_2$ is the second reactor (overall impact copolymer), and $F_c$ is the percent by weight of the dispersed phase in the impact copolymer composition,
the polypropylene impact copolymer composition further characterized as having a melt flow rate in the range of from 25 to 65 g/10 min.

2. The polypropylene impact copolymer of claim 1 wherein the matrix phase comprises from 65 to 85 percent by weight of the impact copolymer composition.

3. The polypropylene impact copolymer of claim 1 wherein the dispersed phase is partially miscible within the matrix phase.

4. The polypropylene impact copolymer of claim 1 wherein the random polypropylene copolymer has from 0.5 to 3 mol percent of units derived from ethylene or $C_4$-$C_{10}$ alpha olefins.

5. The polypropylene impact copolymer of claim 1 wherein the dispersed phase comprises from 15 to 35 percent by weight of the total impact copolymer.

6. The polypropylene impact copolymer of claim 1 wherein the propylene/alpha-olefin copolymer has an alpha-olefin content ranging from 8 to 18 mol percent.

7. The polypropylene impact copolymer of claim 1 wherein the propylene/alpha-olefin copolymer is a propylene/ethylene copolymer.

8. The polypropylene impact copolymer of claim 1 wherein the impact copolymer has been peroxide cracked.

9. The polypropylene impact copolymer of claim 1 wherein the dispersed phase has a comonomer content which is at least 10 percent (absolute) greater than the comonomer content in the matrix phase.

10. The polypropylene impact copolymer of claim 1 further comprising at least one slip additive.

11. The polypropylene impact copolymer of claim 10 wherein the slip additive is erucamide and is present in an amount of from 100 ppm to 2000 ppm.

12. The polypropylene impact copolymer of claim 11 wherein the erucamide is present in an amount of from 250 ppm to 750 ppm.

13. A composition comprising at least one slip agent and a polypropylene impact copolymer composition comprising:
   a) from 65 to 80 percent by weight of the impact copolymer composition of a matrix phase, said matrix phase comprising a random polypropylene copolymer having from 0.5 to 3 mol percent of units derived from ethylene or butylene; and
   b) from 20 to 35 percent by weight of the impact copolymer composition of a dispersed phase, said dispersed phase comprising a propylene/alpha-olefin copolymer having from 8 to 18 mol percent of units derived from ethylene or butylene, wherein the dispersed phase has a comonomer content which is greater than the comonomer content in the matrix phase;
   wherein the impact copolymer is characterized by having a beta/alpha ($\beta/\alpha$) ratio of 0.9 or less,
   with $$\beta/\alpha = \frac{(MFR_1/MFR_2)^{0.213} - 1}{(Fc/100)} + 1$$

where $MFR_1$ is the first reactor (matrix phase only), $MFR_2$ is the second reactor (overall impact copolymer), and $F_c$ is the percent by weight of the dispersed phase in the impact copolymer composition,
the polypropylene impact copolymer composition further characterized as having a melt flow rate in the range of from 25 to 65 g/10 min.

* * * * *